UNITED STATES PATENT OFFICE.

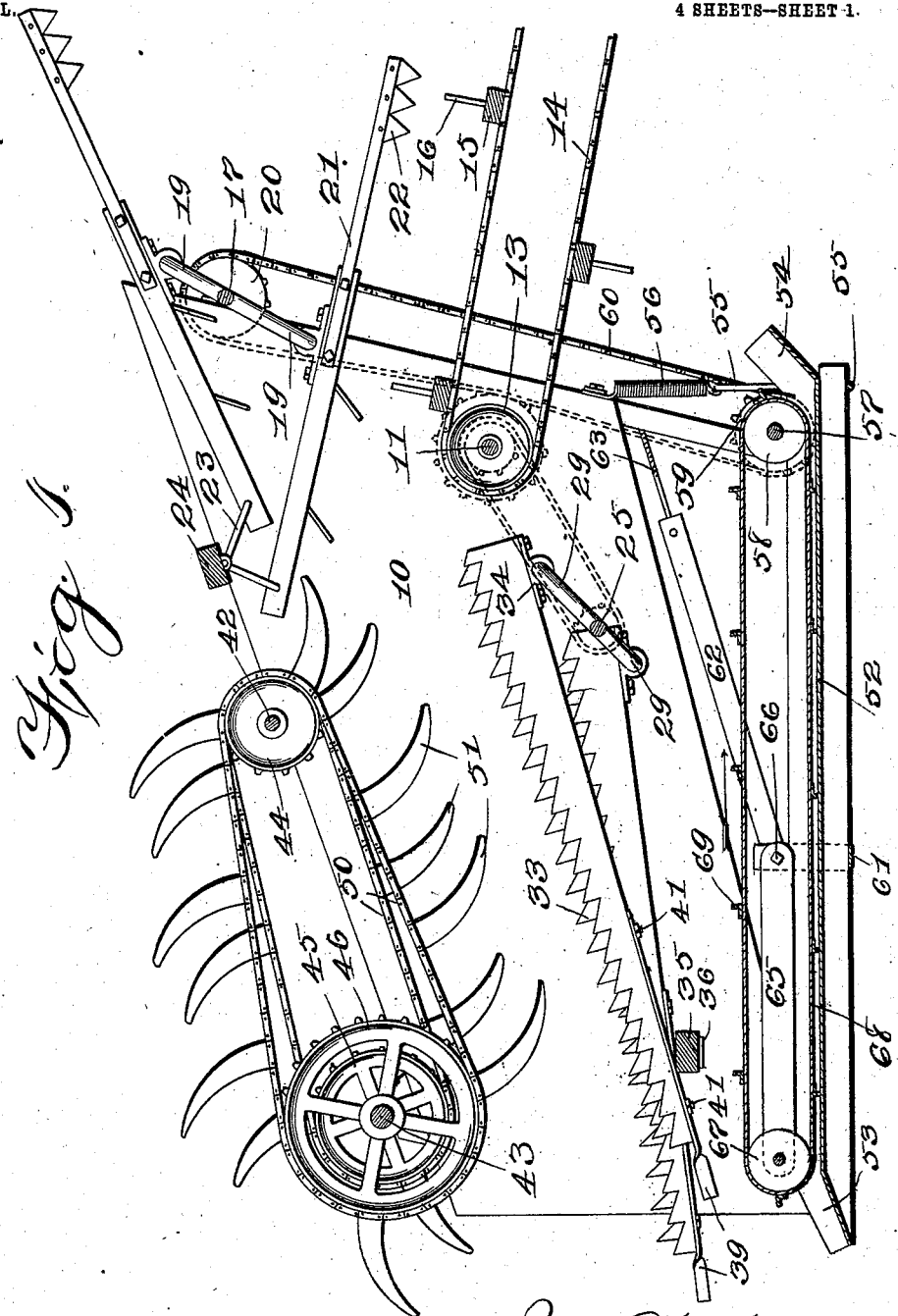

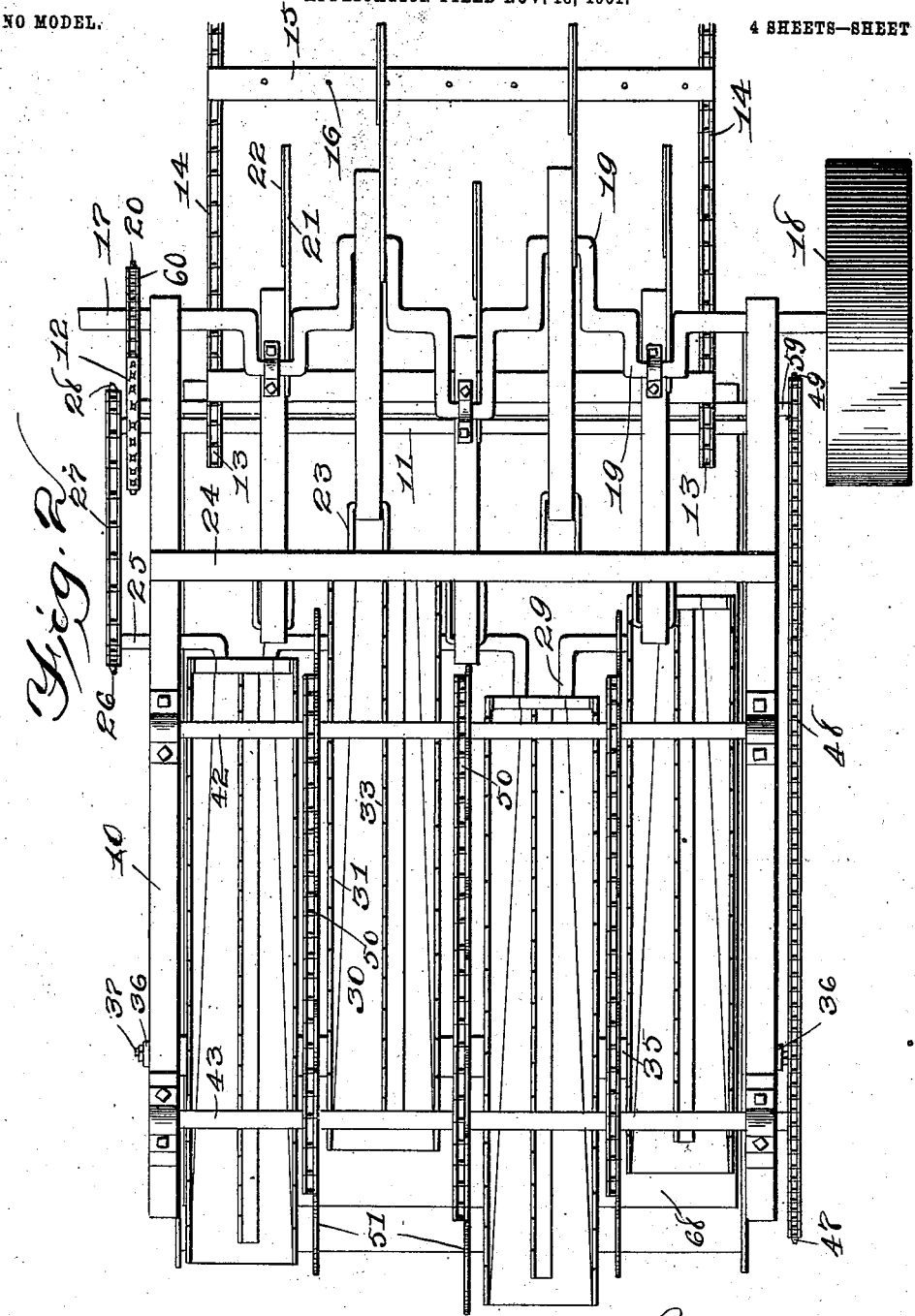

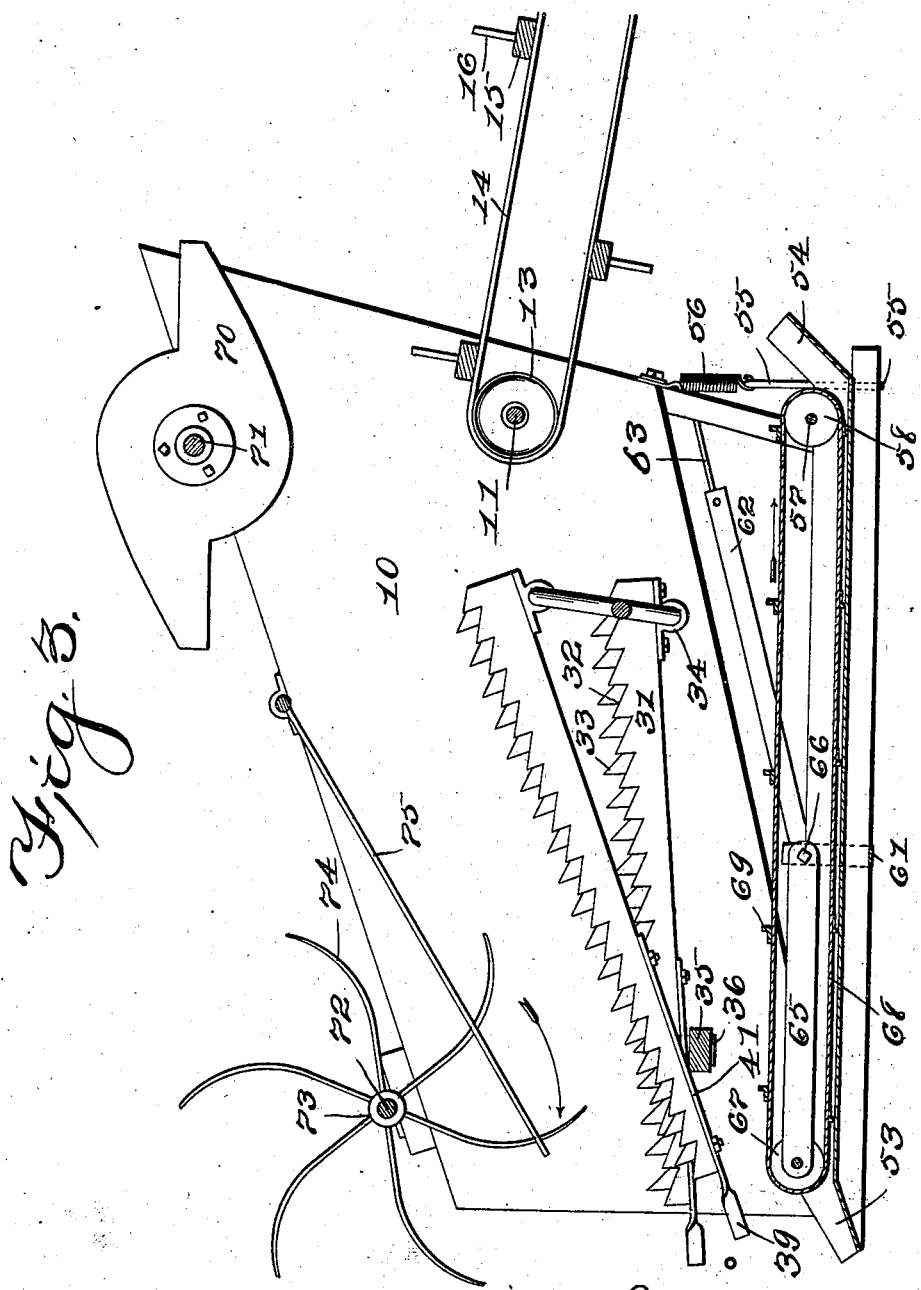

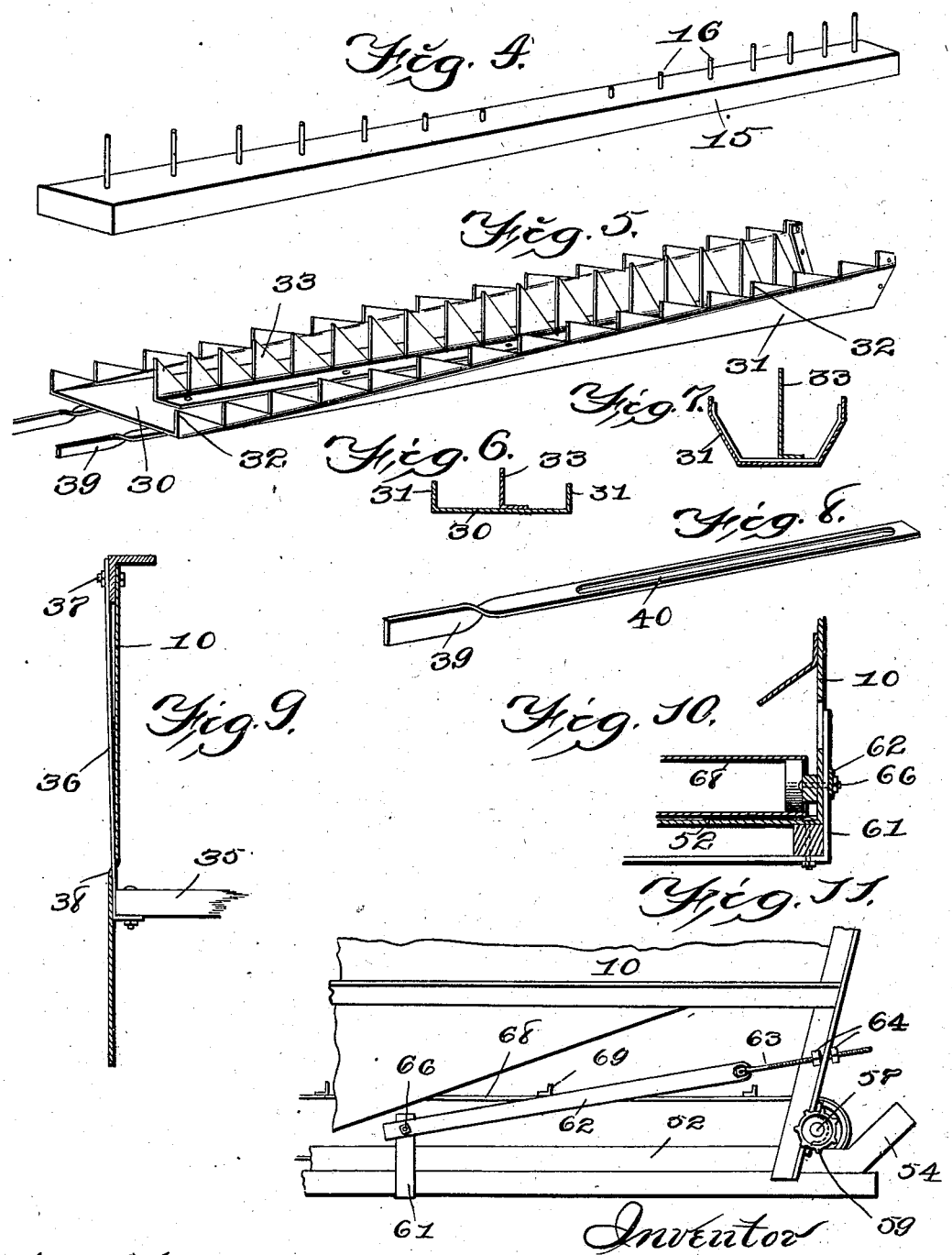

ROBERT SHEDENHELM, OF DES MOINES, IOWA.

BAND-CUTTER AND FEEDER.

SPECIFICATION forming part of Letters Patent No. 724,622, dated April 7, 1903.

Application filed November 18, 1901. Serial No. 82,639. (No model.)

*To all whom it may concern:*

Be it known that I, ROBERT SHEDENHELM, a citizen of the United States, residing at Des Moines, in the county of Polk and State of Iowa, have invented certain new and useful Improvements in Band-Cutters and Feeders, of which the following is a specification.

This invention relates to and consists in certain improvements upon a band-cutter and feeder invented by me and fully illustrated and described in my application for United States Letters Patent, filed April 15, 1901, No. 55,835. In said application mechanism was shown for dividing the grain into sections or portions along vertical lines and then advancing the central sections or portions faster than the outer ones; and my present invention relates more particularly to improved means for accomplishing this same result.

My objects are to provide a conveyer upon which the grain is carried to the band-cutter and feeder and the bands thereof are cut, said conveyer being provided with retarding or holding teeth for the purpose of preventing the band-cutting mechanism from throwing the grain into the machine, and in this connection it is my object to so construct the retarding-teeth on the said conveyer as to divide the bundles of grain along vertical lines and to permit the central portions of the grain so divided to be advanced by the band-cutting mechanism and grain-feeding mechanism, while the outer portions are retarded relative to the central portions by said teeth.

A further object is to provide band-cutting means of the class having oscillating knives, which band-cutters are so arranged that the oscillating knives will after severing the bands tend to separate the grain along vertical lines, and the central knives are given a longer stroke than the outer knives, so that the central portions of the grain after being divided will be advanced more rapidly than the outer portions.

In machines of the class in which the grain is fed to the threshing-cylinder by means of oscillating feeding-pans it has heretofore been found necessary either to provide feeding-pans the body portions of which over which the grain passed were corrugated or notched or else stationary toothed strips were placed between the oscillating feeding-pans. My object is to provide feeding-pans of this class that will be simple, durable, and inexpensive in construction and of comparatively light weight, and it is my object to make these feeding-pans out of sheet metal, the edges of which are turned upwardly and the bottom portions are substantially wedge shape—that is to say, the body portion is widest at the end toward the threshing-cylinder and is narrowed toward the other end, thus forming a pan that is substantially wedge shape—by which construction the grain is prevented from moving backwardly with the pans and can only move forwardly, thereby dispensing with the necessity of using corrugated pans and stationary toothed bars between the pans. In this connection it is my object further to provide means for vertically adjusting the delivery ends of the feeding-pans whereby the grain may be fed to the threshing-cylinder at any desirable point of elevation, and, further, in this connection it is my object to provide fingers on the ends of the feeding-pans adjustable as to length to aid in the separation of the grain before it has passed to the threshing-cylinder.

A further object is to provide grain-retarders to be placed above the feeding-pans, which retarders are of simple, durable, and inexpensive construction and which are so arranged as to retard the outer portions of the layer of grain near the central portion thereof and also hold back the top layer of grain more than the under layer, which is acted upon more directly by the feeding-pans.

A further object is to provide means of simple and inexpensive construction for preventing the accumulation of grain upon the bottom of the machine and for advancing any grain that may fall upon the bottom to the threshing-machine concave.

A further object is to provide means for removing the bottom of the band-cutter and feeder-frame to provide access to the threshing-cylinder.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a vertical central sectional view of the complete machine. Fig. 2 shows a top or plan view of the complete machine. Fig. 3 shows a vertical central sectional view of the complete machine, illustrating certain modifications. Fig. 4 shows a detail sectional view of one of the cross-pieces on the conveyer for carrying the grain near the band-cutting knives and illustrating the retarding-teeth thereof of different lengths. Fig. 5 shows in perspective one of the feeding-pans detached. Fig. 6 shows a sectional view of one of the feeding-pans, taken near its delivery end. Fig. 7 shows a like view taken near the other end. Fig. 8 shows in perspective one of the adjustable fingers for the end of the feeding-pans. Fig. 9 shows a detail sectional view illustrating the means for vertically adjusting the cross-piece which supports the delivery ends of the feeding-pans. Fig. 10 shows a detail sectional view of a part of the machine-frame, showing the means for detachably supporting the bottom of the machine-frame. Fig. 11 shows a detail view of a part of one side of the machine-frame to illustrate the means for tightening the conveyer at the bottom of the machine-frame.

Referring to the accompanying drawings, I have used the reference-numeral 10 to indicate so much of the machine-frame as is shown. This frame is open at its ends and bottom and is preferably made of metal. The detachable bottom portion of the frame will be described hereinafter.

Beginning with the receiving end of the machine-frame, I have used the reference-numeral 11 to indicate a shaft extended transversely of the machine-frame and having a sprocket-wheel 12 at one end, by which the conveyer is driven, as will hereinafter appear. Upon the central portion of the shaft are the sprocket-wheels 13, over which the endless conveyer-chains are passed. These conveyer-chains are connected at suitable intervals by means of the cross-pieces 15, and these cross-pieces are provided with teeth, as clearly shown in Fig. 4, said teeth projecting upwardly from the cross-pieces, the teeth at the end of the cross-pieces being longer than those in the central portion thereof—that is to say, the teeth are of diminishing length toward the central portion and are indicated by the reference-numeral 16. Hence all grain upon the conveyer subjected to the action of the knives or other grain-advancing devices will have its central portions advanced more rapidly than its outer portions. Above the delivery end of said conveyer is a crank-shaft 17, having at one end a belt-wheel 18, by which it is driven. At the central portion of the shaft 17 I have provided one or more crank-arms 19 of suitable length, and near the end portions of the crank-shaft I have provided crank-arms 19 of less length. On one end of the shaft 17 is a sprocket-wheel 20, from which other portions of the operative mechanism are driven.

Pivoted to each of the crank-arms 19 is a band-cutting arm 21, having the knives 22 thereon to project over the conveyer. The opposite ends of the arms 20 are supported by means of the hangers 23, pivoted to the cross-piece 24. This obviously imparts to the band-cutting knives upon the rotation of the shaft an oscillating movement, and the central arms, which are attached to the longer cranks, move through a much greater distance than do the outer arms, which are attached to the shorter cranks. These band-cutting knives serve not only to sever the bands of the bundles of grain, but to aid in separating bundles along vertical lines, and they also aid in advancing the central portions of the layer of grain upon the conveyer because of the longer movement given to the central knives.

Mounted adjacent to and slightly beneath the shaft 11 is a crank-shaft 25, having on one end a sprocket-wheel 26, driven by means of a chain 27, connected with a sprocket-wheel 28 on the end of the shaft 11. This crank-shaft is provided with a series of crank-arms 29, the central ones of which are longer than the outer ones. These crank-arms are provided for the purpose of supporting and operating the feeding-pans by which the grain is delivered to the threshing-cylinder. These feeding-pans are clearly shown in Figs. 5, 6, and 7 and are made of flat sheet metal, with the edges turned upwardly and provided with teeth. The bottom of the pan is wedge shape, being widest at its delivery end and narrowing toward the other end. Hence the delivery end is wide and shallow and the other end is narrow and deep. The bottom of the pan is indicated by the reference-numeral 30, the sides 31, and the teeth 32. Obviously pans of this shape may be readily and quickly stamped from sheet metal and bent to the desired shape. In the longitudinal center of each pan I have fixed a toothed rib 33, the teeth of which are shorter at the delivery end of the pan. On the bottom of each pan is a bearing-box 34 to receive one of the crank-arms 29, and obviously as the crank is rotated the pans will be operated. I have provided means for slidingly supporting the delivery ends of the pans as follows:

The numeral 35 indicates a cross-piece supported on the metal straps 36 at a point near the delivery ends of the pans. The said straps 36 are connected with the machine-frame by means of the bolts 37, and they pass through the slots 38 in the sides of the machine-frame. Hence the cross-piece 35 may be adjusted vertically by persons at the sides of the machine-frame, and that without stopping the feeding-pans. At the delivery end of each feeding-pan I have provided one or more fingers 39. These fingers are longitudinally slotted at 40 and are passed near the feeding-pan and connected therewith by means of the bolts 41, which pass through the slots 40. Hence they may be adjusted longitudinally to project any desirable distance beyond the end of the feeding-pan.

In practical operation the feeding-pans receive the grain from the conveyer, and by means of the vertical side pieces thereof and the toothed central ribs the grain is divided along vertical lines. The central feeding-pans are given a longer movement than the outer pans. Hence the said central pans will advance the grain more rapidly than the outer ones. Furthermore, the grain will be moved toward the threshing-cylinder upon each complete oscillation of the feeding-pans, because the grain cannot move with the feeding-pans when they move in a direction from the threshing-cylinder on account of the wedge-shape feature of the feeding-pans—that is to say, the grain may easily move toward the threshing-cylinder; but when the feeding-pans move in an opposite direction the grain will be wedged therein and cannot slide relative to the feeding-pans in a direction away from the threshing-cylinder. The simple feature of making the bottoms of the feeding-pans wedge shape dispenses with the necessity of corrugating the entire bottom. The fingers 39 project beyond the delivery ends of the feeding-pans and at one limit of their movement come as close as may be practicable to the threshing-cylinder. When feeding grain that is in tightly-packed bundles or that is wet and tangled, the delivery ends of the feeding-pans are elevated in the manner before described, so that the grain strikes the threshing-cylinder comparatively high. The threshing-teeth will engage the grain on the feeding-pans and the fingers 40 will also engage the same portions of the grain, and hence at this point the tightly massed or tangled bundles will be separated and detached, so that they will enter between the threshing-cylinder and the concave in finely-separated particles and not in tangled wet masses, such as would be likely to clog the cylinder. When feeding grain that is light and easily separated, the cross-piece 35 is lowered and the feeding-pans are made to discharge at a point lower upon the threshing-cylinder, because in this position a greater quantity of grain may be passed through the feeder, and, furthermore, when working in light grain the fingers 39 are not projected too far beyond the ends of the feeding-pans. By means of the construction just described any portion of a bundle of grain that is not thoroughly separated and detached from other portions is separated and fed between the cylinder and concave in small portions by means of the fingers on the ends of the feeding-pans working in conjunction with the cylinder-teeth.

In connection with the feature of providing long teeth at the edges of the cross-pieces of the conveyer and omitting the teeth or placing short ones in the center of said cross-pieces I desire to explain that they are of advantage only in connection with other mechanisms tending to draw the grain from the discharge end of the conveyer. However, it is immaterial what particular mechanism is used for this purpose. I have shown and described both the band-cutters and the feeding-pans, each of which serves to accomplish this purpose.

I have also provided means of improved construction for retarding the top layer of grain. Hence the lower layer of grain will enter the threshing-cylinder first, and the heads of the grain will be broken off. Then as the top layer of grain enters the threshing-cylinder the heads thereof will be broken off, but will not be broken off at the same time as the other heads, promoting an even and regular feed to the machine, and the cylinder-teeth need not strike the heads of the lower layer through the top layer of straw. This mechanism comprises two parallel shafts 42 and 43, mounted on top of the machine-frame above the end portions of the feeding-pans. On the upper shaft 42 are three sprocket-wheels 44, loosely mounted, and on the other shaft, 43, are two smaller sprocket-wheels 45 and one large sprocket-wheel 46, all fixed to the shaft 43 and in line with the sprocket-wheel 44. The said shaft 43 is driven by means of the sprocket-wheel 47 and a chain 48, which connects it with the sprocket-wheel 49 on the shaft 57. A series of chains 50 connect the sprocket-wheels 45 and 46 with the sprocket-wheel 44, and obviously the central sprocket-chain will move somewhat faster than the outer ones. Fixed to these sprocket-chains is a series of curved arms 51. In use the shaft 43 is rotated at such speed that the central chain 50 will move slower than the layer of grain is moved by the central feeding-pans, and the outer chains 50 will move slower than the outer portions of the lower layer of grain on the feeding-pans, and the curved arms 51 will enter into the top layer of grain, and hence the said top layer cannot advance faster than the curved arms. This will retard the top layer of grain and will prevent it from being drawn into the threshing-cylinder in large quantities, because the said teeth will hold the grain from the threshing-cylinder, and obviously if one of the curved arms 51 projects into the tightly-compressed or tangled quantity of grain and a portion of the same quantity is engaged by the teeth of the threshing-cylinder the said quantity of grain will be torn apart and fed in a uniform manner to the threshing-cylinder.

The reference-numeral 52 indicates a flat sheet-metal bottom for the machine-frame. The end portion of this sheet-metal bottom adjacent to the threshing-cylinder is inclined downwardly at 53, and the opposite end is inclined upwardly at 54. This bottom piece is supported in position by having the end 53 rest upon the platform in front of the threshing-cylinder, and the other end is supported by means of a metal rod 55, which passes under the end 54 and has its end portions projected upwardly, and attached to the end portions are the contractile coil-springs 56, fixed to the sides of the machine-frame. Hence the bottom 52 is held upwardly, and yet it may be readily detached by simply swinging the metal rod 55 rearwardly beyond the end of the bottom piece, thereby leaving the bottom piece detached from the rest of the machine, so that it may be readily removed by sliding it in a direction away from the threshing-cylinder. I have also provided means in this connection for preventing the accumulation of grain upon the bottom of the machine-frame as follows:

The reference-numeral 57 indicates a shaft having bearings in the sides of the bottom 52 near the end 54, said shaft projecting across the machine-frame at the end thereof. Mounted upon this shaft is a roller 58, and on the end of the shaft is a sprocket 59, connected with the sprocket-chain 60, which sprocket-chain is passed over the sprocket 20 of the band-cutting shaft and which also engages the sprocket 12 of the conveyer-shaft. Hence the shaft 57 is driven during the operation of the machine.

The reference-numeral 61 indicates a strap passed under the bottom 52 and having its ends turned up at the sides of the machine-frame. Fixed to said upturned ends are the bars 62, which bars are connected with a screw-threaded rod 63, which is passed through the machine-frame through which the rod passes, thereby providing means for adjusting the strap 61 longitudinally of the machine-frame. This strap 61 is fixed to the bottom 52, as clearly shown in Fig. 10.

The reference-numeral 65 indicates arms pivoted at one end to the bolts 66, which in turn are passed through the upturned ends of the strap 61, thus providing a pivotal support for the arms 65. These arms are projected in a direction toward the delivery end of the machine, and on the other ends of the said arms 65 are the rollers 67. A conveyer-web 68 is passed over the rollers 58 and 67, and attached to the upper surface of the web are a series of cross-strips 69. Obviously when the shaft 57 is rotated the top portion of the conveyer-web will move in a direction from the delivery end of the machine, and the under portion of the web will rest upon the bottom 52 and will move in a direction toward the delivery end of the machine, and any grain that may be dropped upon the bottom will be carried under the conveyer-web and on top of the bottom 52 toward the delivery end of the machine, and, furthermore, such grain as may be forced into the machine from the threshing-cylinder cannot accumulate and clog the bottom of the machine. Obviously the delivery end of the conveyer-web may move vertically to adapt itself to the irregularities of the bottom 52, and the said end of the conveyer-web may be readily elevated when desired.

The entire bottom 52, together with the conveyer-web, may be removed for the purposes of obtaining access to the threshing-cylinder by simply releasing the rod 55 and then drawing the entire bottom of the machine and the conveyer-web away from the threshing-machine.

In Fig. 3 I have illustrated a modified form of the machine. In this figure attention is first called to the band-cutting mechanism, which is shown to be composed of rotary knife-blades 70, fixed to a shaft 71. This shaft 71 takes the place of the shaft 17 in my preferred form, and the rotary knives are of the ordinary shape and operate in the usual manner. I have also provided a modified form of device for retarding the flow of the outer layer of grain to the threshing-machine. This device comprises a shaft 72, which is substituted for the shaft 43 of my preferred form and which is provided with one or more ribs 73, having radial arms 74, which arms are curved rearwardly relative to the direction of rotation of the said ribs, as indicated by the arrow in Fig. 3, and in order to prevent the grain from becoming entangled in the said arms 74 I have provided one or more rods 75, fixed to the machine-frame and projecting in a direction toward the delivery end of the machine and adjacent to the arms 74. In every other respect the modified form is substantially the same as the machine before described.

Having thus described my invention, what I claim, and desire to secure by Letters Patent of the United States therefor, is—

1. In a band-cutter and feeder, the combination of band-cutting knives and mechanism for delivering grain to a threshing-cylinder, and an endless conveyer to receive and support grain and carry it under the band-cutting knives and to the delivering mechanism, said conveyer having cross-pieces with smooth-topped surfaces upon which the grain may rest, and independent groups of retarding-teeth on the cross-pieces said groups being arranged in line with each other longitudinally of the conveyer, and means for drawing a layer of grain from the conveyer, said means operating to withdraw the grain resting upon the smooth surfaces faster than that engaged by the teeth.

2. In a band-cutter and feeder, the combination of band-cutters, mechanism for delivering grain to the threshing-cylinder, and an endless conveyer to receive and support grain and to carry it under the band-cutters and to the delivering mechanism, said conveyer having cross-pieces having smooth central portions upon which the grain may rest, and a number of retarding-teeth on each cross-piece, the teeth at the end portions of the cross-pieces being longer than those on the central portions thereof, for the purposes stated.

3. In a band-cutter and feeder, the combination of a conveyer provided with cross-pieces, independent groups of retarding-teeth on said cross-pieces, the spaces between the groups being smooth, and band-cutting knives above the conveyer to engage the grain at or near the delivery end of the conveyer to sever the bands of grain and draw the grain from the conveyer, said groups of retarding-teeth having smooth surfaces between them serving with the band-cutting knives to advance that portion of the grain resting upon the smooth surfaces faster than the grain that is engaged by the retarding-teeth.

4. In a band-cutter and feeder, the combination of a series of arms, band-cutters secured to one end of each arm, means for supporting the other end portions thereof whereby oscillatory movement is permitted, and a shaft having a number of crank-arms thereon of different lengths and having the said knife-bearing arms connected with the crank-arms whereby the knife-arms on the longer cranks will give a longer stroke than the others, so that a layer of grain under the knives will be separated by the knives along vertical lines and the central portions of the layers thus separated will be advanced faster than the outer portions and a grain-carrying conveyer beneath the band-cutting knives.

5. In a band-cutter and feeder, the combination of a series of arms, band-cutters secured to one end of each arm, means for supporting the other end portions thereof whereby oscillatory movement is permitted and a shaft having a number of crank-arms thereon of different lengths and having the said knife-bearing arms connected with the crank-arms whereby the knife-arms on the longer cranks will give a longer stroke than the others so that a layer of grain under the knives will be separated by the knives along vertical lines and the central portions of the layers thus separated will be advanced faster than the outer portions, and a conveyer beneath the band-cutting knives and cross-pieces thereon and detachable groups of retarding-teeth on said cross-pieces, said groups being separated from each other.

6. In a band-cutter and feeder, the combination of a series of arms, each arm having a band-cutting knife on one end, means for suspending the other end portion of the arms whereby oscillatory movement is permitted and a shaft having a number of crank-arms thereon, the central crank-arms being longer than the others and having the said knife-bearing arms connected therewith and a conveyer beneath the band-cutting knives, cross-pieces on said conveyer and independent groups of retarding-teeth on said cross-pieces, said groups being separated from each other a feeding-pan having a substantially flat bottom and upright sides, said sides being more widely separated at the discharge end of the pan than at the receiving end.

7. In a band-cutter and feeder, the combination of a series of arms, each arm having a band-cutting knife on one end, means for suspending the other end portion of the arms whereby oscillatory movement is permitted and a shaft having a number of crank-arms thereon, the central crank-arms being longer than the others and having the said knife-bearing arms connected therewith and a conveyer beneath the band-cutting knives, cross-pieces on said conveyer and independent groups of retarding-teeth on said cross-pieces, said groups being separated from each other, a feeding-pan for band-cutters and feeders having a substantially flat bottom and upright sides, said sides being more widely separated at the discharge end of the pan than at the receiving end, said sides also being of greater height at the receiving end than at the delivery end.

8. In a band-cutter and feeder, the combination of a series of arms, each arm having a band-cutting knife on one end, means for suspending the other end portion of the arms whereby oscillatory movement is permitted and a shaft having a number of crank-arms thereon, the central crank-arm being longer than the others and having the said knife-bearing arms connected therewith and a conveyer beneath the band-cutting knives, cross-pieces on said conveyer and independent groups of retarding-teeth on said cross-pieces, said groups being separated from each other, a feeding-pan having a substantially flat bottom and upright sides, said sides being more widely separated at the discharge end of the pan than at the receiving end, said sides also being of greater height at the receiving end than at the delivery end, and teeth at the top of said edges.

9. In a band-cutter and feeder for threshing-machines, the combination of means for advancing grain to the delivery end of the machine, a solid bottom in the machine-frame and detachable therefrom, a rod beneath the rear end portion of the solid bottom having upturned ends at the sides of the machine-frame, contractile springs fixed to said upturned ends and to the sides of the machine-frame whereby the rod is made to normally support the solid bottom, said rod being located in such a position relative to the solid bottom that it may swing from under the bottom to permit the removal of the bottom, and means for detachably connecting the forward end portion of the solid bottom with the machine-frame.

10. In a band-cutter and feeder, the combination of a machine-frame, an endless conveyer arranged above the solid bottom, its lower portion engaging the solid bottom and moving toward the delivery end of the solid bottom, rollers at the delivery turning-point of the conveyer upon which the conveyers travel, and pivoted arms connected with the rollers and extended longitudinally of the conveyer whereby the delivery end of the conveyer may be raised and lowered by the layer of grain passing over it.

11. In a band-cutter and feeder, the combination of a machine-frame, a solid bottom in the machine-frame, an endless conveyer having cross-pieces thereon traveling over the solid bottom, the cross-pieces at the lower portion of the conveyer engaging the solid bottom and traveling toward the delivery end thereof, bars 62 adjustably attached at one end to the machine-frame, arms 65 pivotally connected to the ends of said bars, a roller 67 mounted on the ends of said arms over which the endless conveyer passes at the delivery end of the machine-frame, and a strap 61 connected with the bars 62 to prevent upward movement of the rear ends of said arms, for the purposes stated.

ROBERT SHEDENHELM.

Witnesses:
C. E. CORBETT,
J. RALPH ORWIG.